June 26, 1962 E. R. WEICKGENANNT ETAL 3,041,122
SURGICAL TABLE

Filed Sept. 26, 1960 6 Sheets-Sheet 1

INVENTOR.
EGON R. WEICKGENANNT
ADRIAN COMPER

BY *Thomas T Roesel*

ATTORNEYS

June 26, 1962    E. R. WEICKGENANNT ETAL    3,041,122
SURGICAL TABLE Filed Sept. 26, 1960    6 Sheets-Sheet 3

INVENTOR.
EGON R. WEICKGENANNT
ADRIAN COMPER

BY

ATTORNEYS 3,041,122
SURGICAL TABLE
Egon R. Weickgenannt and Adrian Comper, Rochester, N.Y.; said Weickgenannt assignor to Ritter Company, Inc., Rochester, N.Y., a corporation of Delaware
Filed Sept. 26, 1960, Ser. No. 58,443
29 Claims. (Cl. 311—7)

This invention relates to surgical tables. Reference is made to the copending application of Karl H. Burzlaff, Egon R. Weickgenannt and George E. Martin, Serial No. 56,803, filed September 19, 1960, for a detailed discussion of the surgical table shown herein.

The surgical tables of the prior art have not provided for articulation at the hip joint or if this has been done, it has not been done in an anatomically correct manner. A simple hinge adjacent to the hip joint will not enable the hip joint to articulate from a lowered or level position to a raised position anatomically.

When a patient reclines on his back on the surface of a table, the hip joint does not lie in the plane of the table surface but instead five or six inches above the plane of the table depending on the thickness of the pad with which the table is equipped and depending upon the thickness of the fatty portion of the buttocks below the hip joint. It is, therefore, not anatomically correct to provide a simple hinge for enabling articulation of the patient's hip joint.

The basic objection of this invention is to provide means in a surgical table for swinging a patients upper legs about the hip joint by means of a femoral section so constructed and arranged that the hinge of the table at the knee joint does not apply pressure on any part of the legs and the articulation of the table between the femoral section and the leg rest section always occurs directly below the knee joint.

An object of our invention is to provide an anatomically correct articulation of a surgical table along the line between table sections adjacent which the patient's hip joint lies.

A further object of our invention is to provide, in a sectional surgical table, a novel articulation between the pelvic or seat section and the femoral section.

Another object of the invention is to provide a sectionalized surgical table which articulates between the pelvic or seat section and the femoral section in which when the femoral section is swung in an upward direction, it swings about an axis above the plane of the table, said axis being approximately the axis of the hip joint of a patient reclining on the table.

Still another object of the invention is to provide a table construction wherein a perineal cutout is provided in the pelvic section and a femoral section is articulated with respect to the pelvic section in a manner such that it may be swung downwardly and toward the head of the table so as to lie preferably forward of the edge of the pelvic section adjacent the femoral section of the table to enable the surgeon to have access to the patient through the perineal cutout in an efficient and convenient manner.

This invention is also concerned with the provision in a sectionalized table of novel mechanism for releasably locking the leg rest section of the table with respect to the femoral section thereof, the mechanism enabling the leg rest section to be swung into any desired angular relation with respect to the plane of the femoral section and securely locked in the desired relationship.

A further object of the invention is the provision of means for detachably locking the leg rest section to the femoral section while still permitting a swinging movement of the leg rest section with respect to the femoral section.

The invention further contemplates in a five section table means for telescopically shifting two parts of the femoral and spinal sections to vary the distance between the articulation of the table adjacent the hip joint of the patient and the articulation adjacent the knee joint and to vary the distance between the articulation adjacent the lumbar arch and the articulation adjacent the neck, the arrangement being such that one of the parts of each of the femoral and spinal sections is completely removable from the other part thereof.

Further the invention is concerned with a sectionalized table in which various sections or parts thereof are removable to strip the table down to a pelvic section and short spinal section a part of which is narrow to enable the surgeon to get close to an infant lying on the table; or to strip the table down to a pelvic section and a short femoral section which may be swung out of the way and a part of which is narrow to enable the surgeon to get closer to a perineal cutout provided in the pelvic section whereby the usual and anatomically incorrect kidney bridge is eliminated.

Reference is made to other applications directed to various aspects of the same surgical table: Serial No. 57,807, filed September 22, 1960; Serial No. 57,657, filed September 22, 1960; Serial No. 56,803, filed September 19, 1960, and Serial No. 58,387, filed September 26, 1960. This application is directed to the means for adjusting the length of the spinal or back section; the means for adjusting the length of the femoral or upper leg rest section; the means for articulating the femoral section with respect to the pelvic section; the removability of the telescopic parts of the spinal and femoral sections; the means for enabling removal of the lower leg rest section with respect to the femoral or upper leg rest section; and the means for angularly adjusting and locking the lower leg rest section with respect to the femoral or upper leg rest section.

The surgical table of this invention comprises a table having a table surface, generally indicated by the numeral 31, for the reception of the patient. The metal table surface is adapted to receive one or more cushions (not shown) for the comfort of the patient. The table includes a base 32 from which the table surface is supported; pump and motor housing, generally indicated by the numeral 33; a control box, generally indicated by the numeral 34, which houses the valves for actuating the various hydraulic mechanisms; and a plurality of control handles 36, in this case five, for separately controlling each of the operations of raising and lowering the various sections with respect to each other, raising and lowering the table surface 31 as a whole and laterally and longitudinally tilting the table. In FIGS. 11 to 16, we have illustrated diagrammatically a few of the more important positions, from a surgical standpoint, in which the patient may be placed.

The base 32 is mounted on four casters 37 which are provided with locking means (not shown) to hold the casters against movement when the table is in use, as shown and particularly described in Karl H. Burzlaff application Ser. No. 777,870 filed December 3, 1958.

A pedestal or support column, generally indicated by the numeral 38, is mounted on the base 32 and supports the table or table surface 31. The table comprises five sections a headrest section 39, a spinal or back section 41—41' (FIGS. 4 and 5) a pelvic or seat section 42, a femoral section 43—43' (FIGS. 4 and 5) and a foot or leg rest section 44. The headrest section 39 is manually operated, as presently will appear, the spinal section is operated by a hydraulic piston and cylinder assembly, generally indicated by the numeral 46, and the femoral section 43 is operated by a hydraulic piston and cylinder assembly generally indicated by the numeral 47. The purposes and advantages of a five section table will be fully described and claimed in a separate application Serial No. 58,387, filed September 26, 1960.

Referring now to (FIG. 3) the table 31 is raised and lowered by a hydraulic piston and cylinder assembly, generally indicated by the numeral 48. Lateral tilt of the table about a longitudinal axis is accomplished by a cylinder and a piston assembly, generally indicated by the numeral 49. Movement of the table to Trendelenburg (FIG. 11) or reverse Trendelenburg (FIG. 13) positions, that is, pivoting the table about a horizontal transversse axis, is accomplished by a piston and cylinder assembly generally indicated by the numeral 51.

Figure 3:
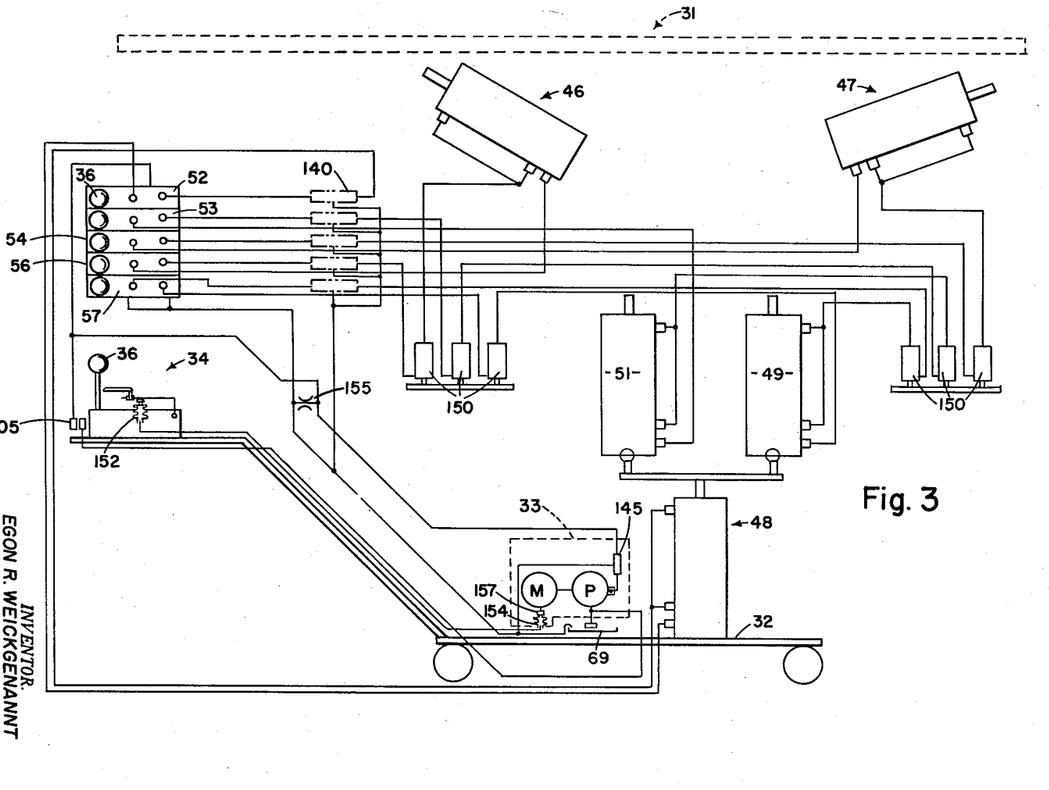
FIG. 3 is a schematic view of the hydraulic system of the table.

In FIG. 3 the hydraulic system has been shown diagrammatically. From this diagrammatic view, it is believed the hydraulic system will be clear without specifically showing the hydraulic lines in other views. Housed in the control box 34 are five valve assemblies: a table elevating and lowering valve assembly 52; a Trendelenburg and reverse Trendelenburg valve assembly 53; a femoral valve assembly 54; a back or spinal cylinder valve assembly 56; and a lateral tilt valve assembly 57. Each of the hand controls 36 has a neutral central position, a forward position and a back position.

It is sufficient for present purposes to state that when the handle 36, associated with the table elevating valve 52, is pulled rearward from its central neutral position, oil is supplied to the bottom of the elevating cylinder 48 to urge the piston therein in an upward direction. Simultaneously, oil is exhausted from the top of the elevating cylinder and returned to a sump or oil reservoir 69. Similarly with the valves 53, 54, 56 and 57. When the handle corresponding to each of these valves is pulled rearward, oil is supplied respectively to the top of the Trendelenburg cylinder 51, the bottom of the femoral cylinder 47, the bottom of the spinal or back cylinder 46 and the bottom of the lateral tilt cylinder. Simultaneously the upper or lower ends of these cylinders are connected to the exhaust or oil sump 69. Reverse movement of the handles reverses the direction of oil flow.

The hydraulic system includes a pressure limit switch 145, pressure limit cut off valves 150, a vent 155 for the entire hydraulic system and a motor and pump unit marked respectively M and P. The system further includes a hand controlled motor starting system comprising oil filled bellows 152 and 154 connected by a pressure line and a micro switch 157. Connections are provided at 105 for a hand pump in case of power failure.

Figure 6:
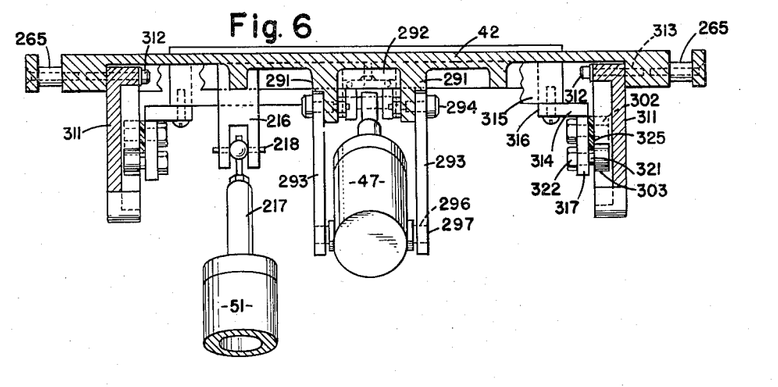
FIG. 6 is a sectional view taken substantially on the line 6—6 of FIG. 1 in the direction indicated by the arrows.

Referring to FIG. 6, depending below and integral with the pelvic section of the table top, is a bifurcated bracket or boss 216 which is connected to the upper end of a piston rod 217 secured to the piston of the Trendelenburg cylinder 51 by a universal joint 218. A full description of the Trendelenburg cylinder and its connecting parts is given in the above mentioned application.

Figure 1:
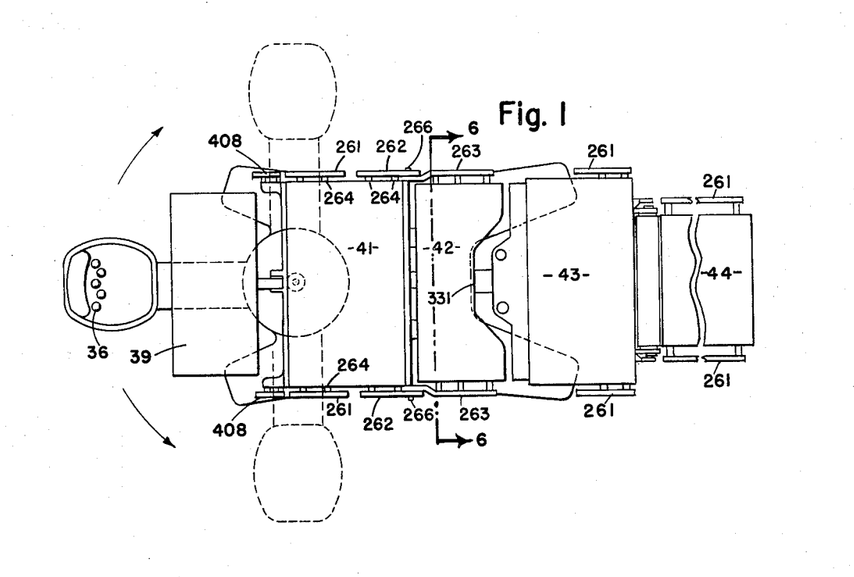
FIG. 1 is a top plan view of a five section table in which the invention of this application is incorporated.
Figure 2:
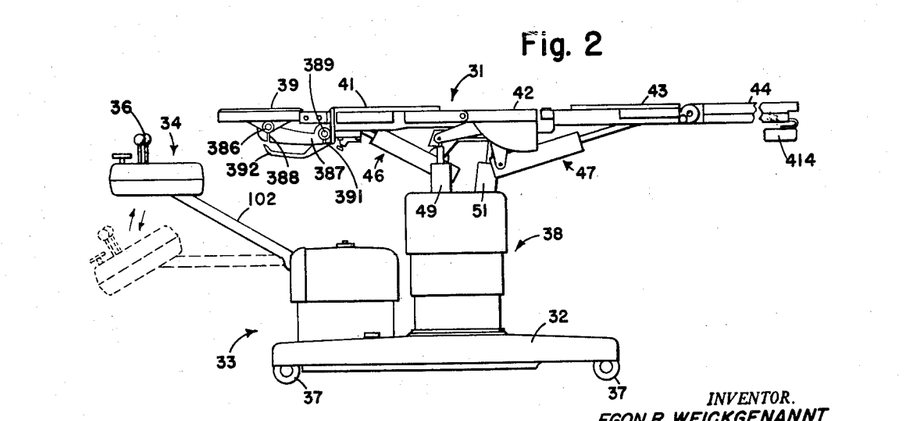
FIG. 2 is a side elevation thereof.

Referring now to FIGS. 1 and 2, the table includes side rails 261, 262 and 263 on each side of the table. The side rails are rigidly secured to the various sections by means indicated at 264 having spacers 265 (FIG. 6) mounted thereon. These side rails are for the purpose of adjustably holding clamps for arm rests, leg rests, or stirrups, an anesthetic screen and other removable accessories with which the table may be equipped. Between the pelvic section and the spinal section, these side rails are overlapped and formed with openings to receive hinge pins 266 on opposite sides of the table.

Figure 7:
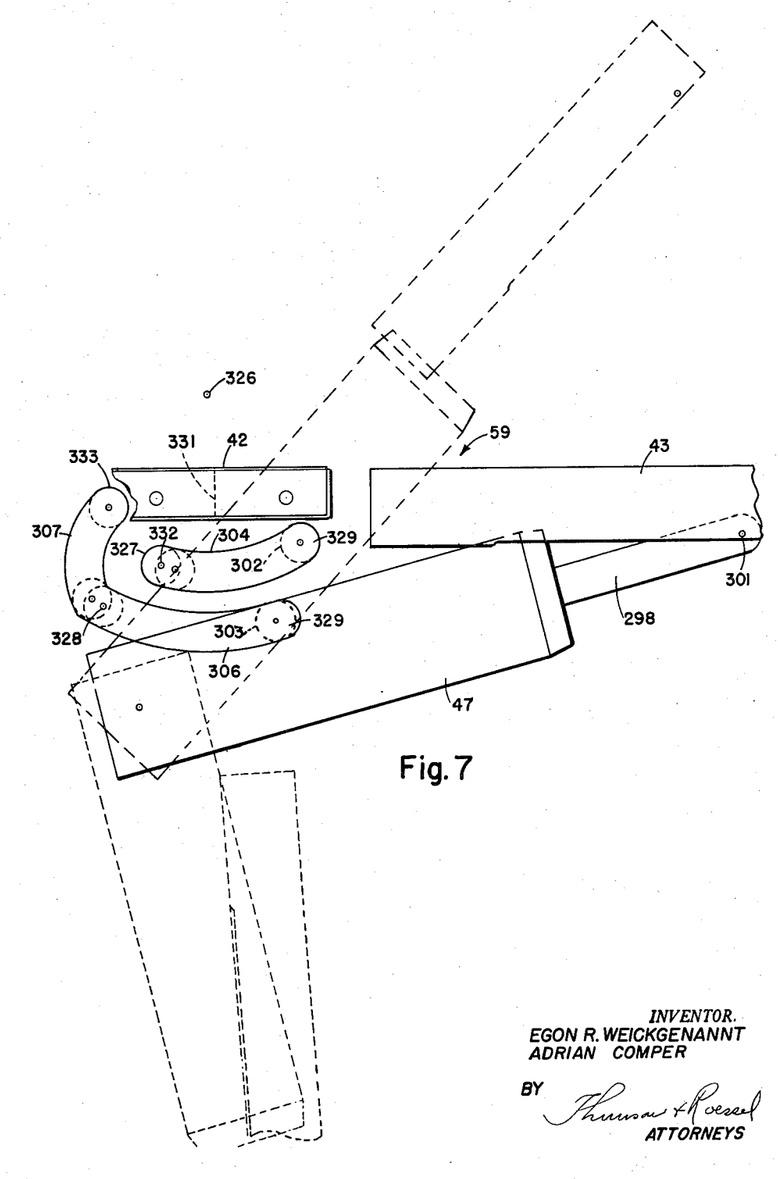
FIG. 7 is a view showing the articulation between the pelvic section and the femoral section with the solid line position being the position of the parts when the sections are in alignment with each other and the dotted line positions showing the extreme upward position of the femoral section and the extreme lower position of the femoral section.

Referring now patricularly to FIGS. 6 and 7, the hinge arrangement between the femoral section and the pelvic section is shown and is the major subject of this application. Depending from the pelvic section 42 (FIG. 6) are a pair of bosses 291 which have a cutout 292 between them. A pair of support plates 293 are fixed by means of a plurality of screws 294 threaded into the bosses and pass through the plates 293. Carried at the lower end of the femoral cylinder 47 is a pair of pivot pins 296 which are supported in the bottom of the cylinder and extend outward through apertures 297 in the plates 293. The femoral cylinder 47 is free to swing about the axis of the pivot pins 296.

The femoral cylinder has a piston mounted therein to either side of which oil may be admitted, as indicated diagrammatically in FIG. 3. Simultaneously with the application of oil to one side of the piston, oil is exhausted back to the sump 69 from the other side thereof. A piston rod 298 is secured to the piston (FIG. 7) and is pivoted to a boss depending from the lower side of the femoral section 43, the pivot point of the piston rod being indicated at 301.

Referring to FIG. 7, the femoral section must be capable of swinging from the horizontal position shown in solid lines in that view to either of the dotted line positions shown in the same figure. This swinging movement is accomplished by a compound motion produced by a pair of rollers 302 and 303 riding in cam grooves 304, 306 and 307.

The hip joint of a patient lies five or six inches above the pelvic section and the compound movement allows for this condition, the movement of the femoral section allowing the hip joint to swing naturally about this axis. A pair of brackets 311 (FIG. 6) depend from the underside of the table adjacent the sides thereof. The brackets are attached to a side shoulder formed on the table top by screws 312 which pass through the brackets 311 and are secured to the table, as indicated at 313. The brackets 311 carry the cam grooves 304, 306 and 307 (FIG. 7).

Depending from the underside of the femoral section 43 at opposite sides thereof and attached thereto by screws, are a pair of bosses 315. The bosses 315 each carries a bracket 314 which is angularly shaped or inverted L-shaped, as viewed in FIG. 6. The base 316 of the inverted L, extends outward and has an elongated portion 317 extending toward the pelvic section or head end of the table. Adjacent the end of part 317 of the bracket 314, a pair of pivot pins 321 are located which are secured to the portion 317 of the bracket 314, as indicated at 322. The rollers are thus carried by the femoral section 43 while the cam grooves in which they rotate are carried in the pelvic section 42. Nylon spacers 325 are interposed between the bracket part 317 and brackets 311.

Referring again to FIG. 7, the hip joint is assumed to lie five or six inches above the table surface at an imaginary point 326. This point lies well above the table surface because of the pad with which tables are equipped and because of fat portions of the body below the hip joint. This imaginary point 326 is located as accurately as possible considering the differences in the physical makeup of various persons. The cam groove 304 is circular with the imaginary point 326 at the center of the circle. When the femoral section is in the solid line horizontal position of FIG. 7, the roller 329 lies at the end 327 of the cam groove and the roller 303 lies with its axis at the position 328.

When oil is admitted to the lower side of the piston in the femoral cylinder 47, the piston shifts the femoral section to the dotted line position shown in FIG. 7 or any intermediate position. During this movement the rollers 302 and 303 shift to the right in the cam grooves 304 and 306 until they engage stops 329. Since the cam grooves 304 and 306 are on the arc of a circle, the approximate center of which is the hip joint 326, the femoral portion of the patient's body swings with the femoral section 43 about the axis 326 of the hip joint. It will be particularly noted that when the femoral section 43 is swung upward the head end of the femoral section moves away from the foot end of the pelvic section, even though the rearward end of the femoral section stays in the same relationship to the hip joint 326, i.e., the femoral portions of the body do not shift with respect to the femoral section.

Referring now to FIG. 1 (see also FIGS. 4 and 5) the pelvic section has what is known in the art as a perineal cutout 331. When the table is to be used for perineal operations, the femoral section must be moved to an out-of-the-way position so that the surgeon is able to be seated close to the perineal cutout. For this reason, the compound movement of the femoral section is necessary.

In moving the femoral section from the solid line position of FIG. 7 to the dotted line position shown in that view, oil under pressure is admitted to the femoral cylinder 47 at the upper side of the piston within the cylinder and exhausted from the lower side thereof, as indicated in FIG. 3. As previously stated, when the femoral section is horizontal the roller 302 is in engagement with the end 327 of the cam groove 304. The axis of movement of the femoral section then becomes the axis of the roller 302 now located at the point 332. Actuation of the piston within the cylinder 47 then causes the roller 303 to move through the cam groove 307 about the axis 332 until the roller 303 reaches the end 333 of the cam groove 307. This movement of the femoral section results in the femoral section moving to the lower dotted line position of FIG. 7 in which position the femoral section essentially hangs downward almost vertically from the pivot point 332. The upper surface of the femoral section is, toward the head end of the table, spaced from the foot end of the pelvic section as is apparent from an examination of FIG. 7. The surgeon is then able to seat himself in close proximity to the perineal cutout with little or no interference from the femoral section.

Figures 8, 9, 10:
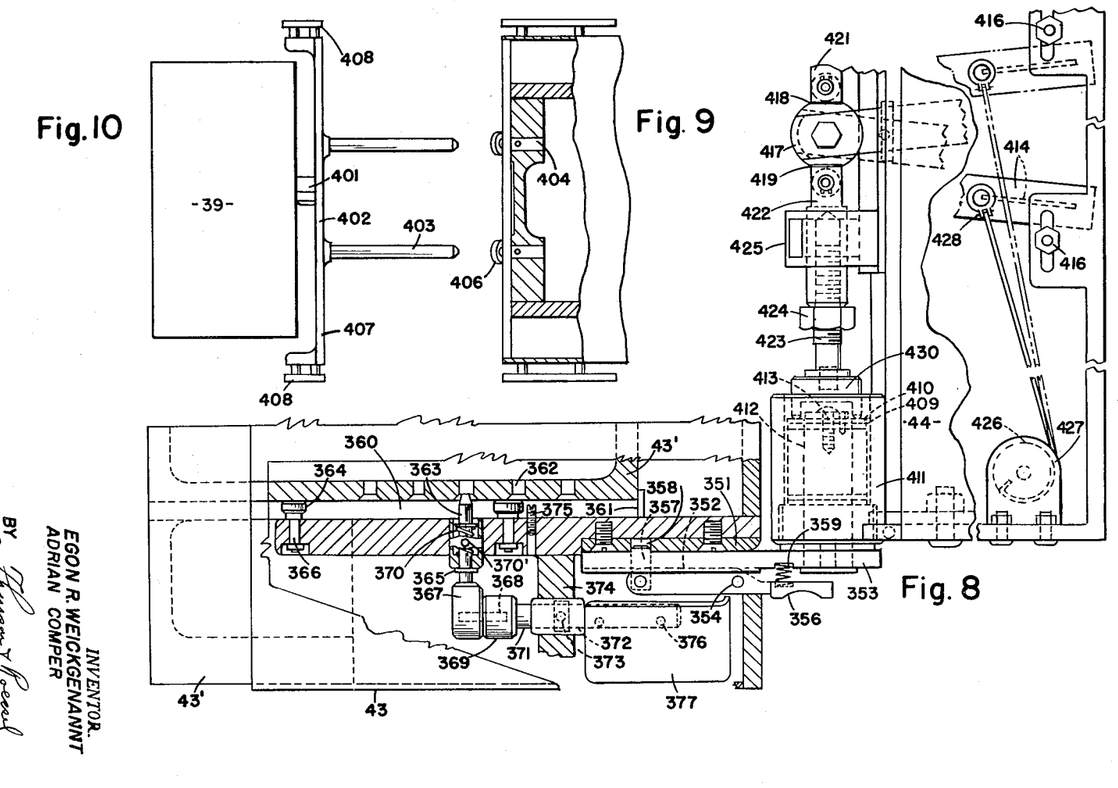
FIG. 8 is a view, partly in section, looking at the bottom of the table and indicating how a part of the femoral section may be telescopically shifted and located as desired with respect to another part, showing how the telescopically movable part may be removed from the other part and showing how the leg rest section may be removed from and locked with respect to the telescopically movable femoral part.
FIG. 9 is a view partly in section showing the head end of the spinal section.
FIG. 10 is a top plan view of the head rest section.

As shown in FIG. 8 which is a sectional view of the underside of the femoral and leg table sections, the foot section 44 is removable from the femoral section 43. For this purpose the femoral section has an adapter 351 secured thereto by screws on each side of the table. Each adapter has a track or ways 352 therein for the reception of a slide member 353 mounted on the foot section 44. The slide member 353 on each side of the table has a finger piece 356 which is pivoted at 354 by which the finger piece may be swung about the pivot 354. The end of the finger piece has a locking pin 357 pivoted thereto which fits into a bore 358 formed in the adapter 351 end of the femoral section. A spring 359 normally holds the slide member in the position of the parts shown in FIG. 8.

When the foot section is to be removed, the finger pieces 356 on each side of the table are pressed inward against the action of springs 359 to withdraw locking pins 357 from the bores 358. The slide members 353 may then be moved to the right, as viewed in FIG. 8, in the ways 352 and the foot section slid off the end of the femoral section. When replacing the foot section, the opposite of this operation is performed.

In most adults, the difference in their heights primarily occurs in their legs and in their spinal or back sections. For this reason, the back or spinal section 41 and the femoral section 43 are made adjustable in length. The means for adjustment of the length of these two sections is the same so that a description of one will suffice.

Figure 4:
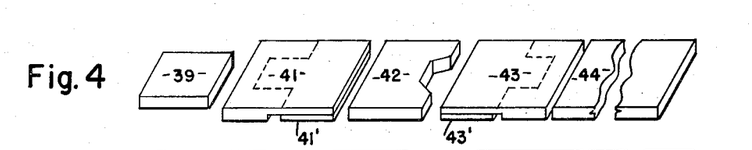
FIG. 4 is a schematic view showing the five sections of the table and indicating the articulating joints between them.
Figure 5:
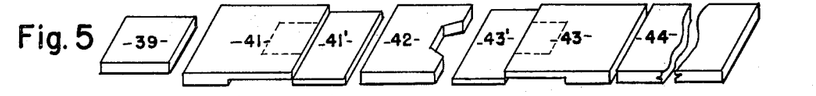
FIG. 5 is a schematic view similar to FIG. 4 showing the spinal section and the femoral section, telescopically shifted so as to increase the length of the table to accommodate persons of larger stature.

In FIG. 4 the fixed spinal section has been indicated by the numeral 41' while the movable spinal section has been indicated by the numeral 41. The spinal cylinder 46 is pivoted to the fixed section 41'. Similarly the fixed femoral section has been indicated by the numeral 43' and the movable femoral section by the numeral 43. The femoral hydraulic cylinder 47 (see FIG. 7) is pivoted at 301 to the fixed femoral section 43'.

The adjustability of the spinal and femoral sections is illustrated in FIG. 8. The fixed femoral section 43' is shown at the left of FIG. 8. To enable this adjustability and removability of the adjustable section 43, the underside of the fixed section 43' is provided with a track or ways 360 on each side thereof. One side of each of the ways has a plurality of, in this case, five openings or bores 362 for the reception of locking pins 363. Rollers 364 are rotatably mounted on pins 366 suitably fixed to the movable femoral part 43.

The locking pin 363 is normally pressed toward locking relation with one of the bores 362 by a spring 370 mounted in a recess which seats in a part of the casting and presses against a snap ring 365 mounted in a groove formed in the locking pin. A set screw 370' enables adjustment of the locking pin 363. A fitting 367 is secured to the locking pin and receives an eccentric pin 368. The eccentric pin is eccentrically secured to a rotatable member 369 mounted on a shaft 371 which has a flat side. A bearing member 372 is located in a bore formed in a wall 374 formed on the underside of the removable section 43. The bearing member 372 is fixed and the shaft rotates within it. A set screw 373 extending through the casting holds the bearing member against movement longitudinally and rotationally in the bore. The shaft 371 has a flat extension 376 which is secured in any suitable manner to a hand release piece 377. Upon loosening and resetting the set screw 370', hand release piece 377 may be set as desired.

It will now be understood that upon moving the hand release piece, the shaft 371 will be rotated and the eccentric pin 361 will rotate to reciprocate the fitting 367. This action will withdraw the locking pin 363 against the action of spring 370 from the particular bore 362 in which it is seated. The movable section 43 may then be shifted with relation to the fixed section to the desired position as diagrammatically illustrated in FIG. 4. In FIG. 3 the movable spinal section 41 and the movable femoral section 43 have been superimposed over the fixed sections 41' and 43' respectively. In FIG. 4 the spinal and femoral sections have been extended their maximum distance. As will be apparent from FIG. 6, the movable femoral section 43 may be completely removed from the fixed section 43'. Similarly the movable spinal section 41 may be completely removed from the fixed spinal section 41'. A stop pin 375 and cutout stop plate 361' (FIG. 6) prevent unintended removal when extending the section. In order to remove the section, the section has to be lightly lifted when the stop pin touches the stop plate.

Figures 11, 12, 13, 14, 15, 16:
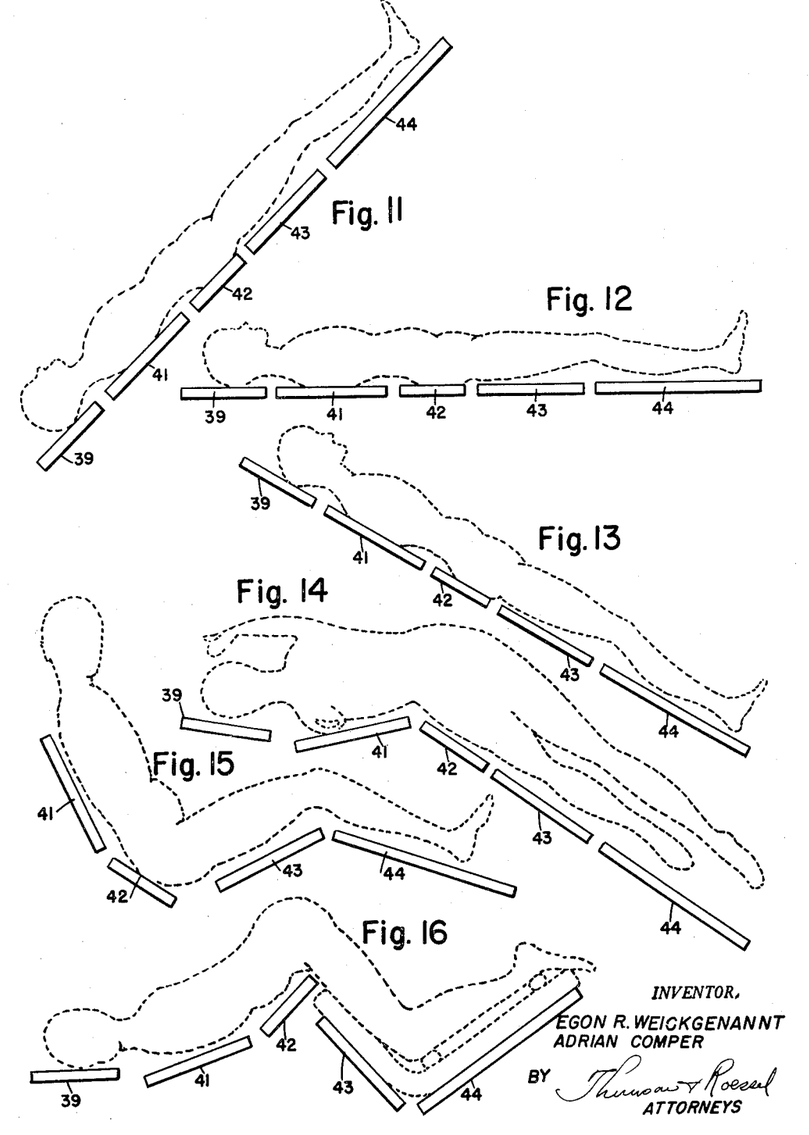
FIGS. 11 to 16, inclusive, diagrammatically illustrate some of the very many positions into which the table may be swung and the sections articulated.

In the performance of certain operations the upper legs must be raised while the lower legs may be allowed to retain their original position or may be raised if desired. Such a position is illustrated in FIG. 15. A similar raising of the upper legs may be accomplished merely by activating the femoral cylinder to allow venous gravity return to the heart. This avoids the necessity of placing the entire table in Trendelenburg and interrupting an operation on the upper part of the body. Other surgical situations exist where the upper legs must be raised and the lower legs lowered.

The combination of the particular articulation of the femoral section with respect to the pelvic section and the length adjustability of the femoral section enables the positioning of the parts 43 and 44 of FIG. 15 without causing pressure on any part of the legs. By adjusting the length of the femoral section to fit the patient so that the joint between the femoral section and the leg rest section lies directly below the knee joint, the femoral section may be raised without changing the relationship of the knee joint with respect to the joint in the table. This is so because the femoral section swings about an axis 326 above the table surface as previously described. Cases have been known, when using present surgical tables and failure of the surgical team to use adequate additional padding, where the legs of the patient had to be amputated due to long exposure of the lower legs to pressure.

The head rest section 39 is removable from the spinal section 41 as will presently appear. Thus the head rest section 39, the removable spinal section 41, the removable leg rest section 44 and the removable femoral section 43 may all be removed from the table leaving only the seat or pelvic section 42 and the short sections 41' and 43' articulated with respect to the pelvic sections. All the actuating elements previously described are operatively connected to these three sections.

Referring now to FIG. 2, the head rest section 39 has been shown. The head rest 39 may be swung about a pivot 386 secured to an arm 387 the end of which is split at 388. The head rest assembly may pivot about a pivot 389 and be locked in any desired adjusted position. For this purpose the arm 387 is split at 391 and a hand operated clamp 392 opens and closes the gaps at 388 and 391, to release the head rest assembly to enable it to be shifted and locked in a desired adjusted position. The head rest, for example, may be shifted so that it hangs downward normal to the plane of spinal section 41 or at its other extreme rests on the spinal section either normal thereto or at a tilt angle. The single hand lever locks both clamps 388 and 391. The specific manner in which this is accomplished is old and well known and per se does not constitute part of the present invention.

As previously mentioned the head rest section is removable from the spinal section 41. This is illustrated in FIG. 10. For this purpose attached to the arm 387 is a connecting piece 401 which has a bracket 402 secured thereto. The bracket 402 has two forks 403 rigidly secured thereto which fit into bores 404 formed in the underside of the spinal section 41. The forks are locked in the bores by hand clamps 406 the ends of which engage the forks. Within limits the headrest assembly may be shifted toward and away from the spinal section 41. The head rest assembly has side extensions 407 which carry side rails 408. The side rails are for the purpose of supporting an anesthetic screen assembly and for this reason are movable with the head rest.

The leg rest section 44 is releasably locked with respect to the movable part 43' of the femoral section. This locking means, located on the underside of the leg rest section, comprises a multiplicity of discs 408 and 409 only two of whch have been shown. The discs 408 are splined to a casing 411 while the discs 409 are splined to a shaft or rod 412 as shown at 413.

A hand release lever 414 extends below the end of the leg rest section, is supported in any suitable manner and has adjustable stops 416. The inner end of the lever 414 is fitted to a cam 417 which has two flat spots 418 and 419. The cam 417 actuates a pair of pushrods 421 and 422 through rollers riding on the cams. The pushrods include threaded members 423 having nuts 424 thereon threaded into sockets in the pushrods. A U-shaped mounting 425 for slidably receiving the pushrods is supported from the leg rest section. A spring 426 coiled in a cage 427 carried by the leg rest section is extended and tied to the hand release lever 414 as shown at 428.

In the solid line position of the release lever 414, the cam is rotated from the position of FIG. 8 and the pressure of the spring and the action of the cam is such as to exert pressure on pressure members 430 rigidly connected to the threaded members 423. The force exerted on the pressure members 430 may be varied by adjusting the nuts 424.

The casing 411 is fixed to the leg rest section and rotates with it about the axis of the shaft 412. The shaft 412 is fixed to the slide member 353. When pressure is applied on the outer plate 408, the discs are free to shift and apply pressure between the discs 410 and 409 and since the shaft 412 is fixed in position, the casing 411 is rigidly held and the leg rest is locked in the desired adjusted position with respect to the movable part 43' of the femoral section.

To release the foot rest section the hand release lever is shifted to the dotted line position which frees the discs 410 and 409 from frictional engagement and permits rotation of the foot rest section about the axis of the shafts 412. When the leg rest section reaches the desired position of adjustment, the hand release lever is released and the spring 426 snaps the cam 417 to locking position to apply pressure on the discs and lock the leg rest in the adjusted position. The action is therefore a self-locking one. Moreover, because the locking mechanism is approximately on the axis of articulation, the leg rest section may be rotated through an arc of 180° or more. Angular locked positions of the leg rest with respect to the movable part 43 of the femoral section are shown in FIGS. 15 and 16.

While we have shown and described the preferred form of mechanism of our invention it will be apparent that various modifications and changes may be made therein, particularly in the form and relation of parts, without departing from the spirit of our invention as set forth in the appended claims.

We claim:

1. A surgical table or the like comprising, in combination, a plurality of table sections operatively connected together, one of said sections being a pelvic section and another of said sections being a femoral section and means for articulating said femoral section with respect to said pelvic section about an axis above the table surface at approximately the location of the hip joint of a patient reclining on the table.

2. A surgical table or the like comprising, in combination, a plurality of table sections, two adjacent of said sections being a pelvic section and a femoral section having means between them for articulating said sections and swinging one section with respect to the other, said means comprising means for moving said femoral section upward and away from the pelvic section and downward and toward the pelvic section, said means including cam means on one section and rollers carried by the other section.

3. A surgical table or the like comprising, in combination, a plurality of table sections, two adjacent of said sections being a pelvic section and a femoral section having means between them for articulating said sections and swinging one section with respect to the other, said means comprising means for moving said femoral section upward and away from the pelvic section and downward and toward the pelvic section, said last mentioned means including at least a pair of cam grooves on one section and at least a pair of rollers carried by the other section.

4. A surgical table or the like comprising, in combination, a plurality of table sections, two adjacent of said sections being a pelvic section and a femoral section having means between them for articulating said sections and swinging one section with respect to the other, said means comprising means for moving said femoral section upward and away from the pelvic section and downward and toward the pelvic section, said last mentioned means including means for swinging said one section about a pivot above the table level when swinging said one section above the other and swinging said one section about a pivot below the table level when swinging said one section below the other.

5. A surgical table or the like in accordance with claim 1 in which when the femoral section is swung downward with respect to the pelvic section it swings about an axis below the table surface.

6. A surgical table or the like comprising, in combination, a plurality of table sections operatively connected together, one of said sections being a pelvic section and another of said sections being a femoral section, a perineal cutout in the edge of said pelvic section and means for swinging said femoral section downward and toward the head end of the table to enable access to said perineal cutout.

7. A surgical table or the like in accordance with claim 6 in which the femoral section lies wholly toward the head end of the table from the edge of the pelvic section in which perineal cutout is located.

8. A surgical table or the like in accordance with claim 6 in which when the femoral section is swung upward it swings about an axis above table surface.

9. A surgical table or the like comprising, in combination, a plurality of table sections operatively connected together, one of said sections being a pelvic section and another of said sections being a femoral section, means for articulating said femoral section with respect to said pelvic section, said means comprising brackets extending downward from said femoral section, each of said brackets having a pair of cams, rollers carried by the pelvic section riding on said cams, said cams being shaped so that one set of rollers controls the movement of the femoral section when the femoral section is above the horizontal and another set controls the movement of the femoral section when the femoral section is below the horizontal.

10. A surgical table or the like in accordance with claim 9 in which pivot axis of the femoral section is above the table surface when the femoral section is swung upward from the horizontal position and below the table surface when the femoral section is swung downward from the horizontal position.

11. A surgical table or the like comprising, in combination, a plurality of sections operatively connected together, one of said sections being a pelvic section, another of said sections being a femoral section and another of said sections being a foot rest section, means articulating said femoral section with respect to said pelvic section, means including a latch element for releasably latching said leg rest section to said femoral section and locking means for releasably locking said leg rest section in any desired angular relation with respect to said femoral section.

12. A surgical table or the like in accordance with claim 11 in which the locking means for the leg rest section includes cam actuated locking pins and a hand operated lever extending under the leg rest section for actuating the cams.

13. A surgical table or the like comprising, in combination, a plurality of sections operatively connected together, one of said sections being a pelvic section, another of said sections being a femoral section and another of said sections being a foot rest section, guide elements on one of said two last named sections and slide elements on the other and releasable locking means between said guide and slide to enable removal of the foot rest section from the femoral section, means for articulating said femoral section with respect to said pelvic section and means for articulating said leg rest section with respect to said femoral section.

14. A surgical table or the like in accordance with claim 13 in which the foot rest section has releasable locking means constructed and arranged to apply pressure on one set of said elements to enable locking of the foot rest section in any desired relation with respect to the femoral section.

15. A surgical table or the like in accordance with claim 13 in which said femoral section is in two parts, one of said parts being removable and the other of said parts being articulated with respect to the pelvic section, said removable part having a plurality of adjustable relations with respect to the pivoted part whereby the femoral section is adjustable in length.

16. A surgical table or the like comprising, in combination, a plurality of sections operatively connected together, one of said sections being a pelvic section, a second being a femoral section and a third being a leg rest section, means for articulating the femoral section with respect to the pelvic section so that the upper legs of the patient swing about the hip joint, means for articulating the leg rest section with respect to the femoral section and means for adjusting the length of the femoral section in accordance with the physical proportions of the patient so that the articulation between the femoral section and the leg rest section occurs substantially directly below the knee joints.

17. A surgical table or the like in accordance with claim 16 in which the leg rest section may be removed from the femoral section.

18. A surgical table or the like in accordance with claim 16 in which the femoral section has two telescopic parts, one of which is removable from the other.

19. A surgical table or the like in accordance with claim 16 in which the femoral section swings with respect to the pelvic section about an axis above the table surface, said axis being substantially coincident with the patient's hip joint.

20. A surgical table or the like comprising, in combination, at least five table sections connected in series, said table sections including a head section, a spinal section, a pelvic section, a femoral section and a leg section, said connections providing means for articulating said table sections with respect to each other, a perineal cutout in said pelvic section at the edge thereof adjacent said femoral section and means for moving said femoral section and said leg section out of the way to enable a surgeon to gain access to the patient through the perineal cutout.

21. A surgical table or the like comprising, in combination, at least five table sections connected in series, said table sections including a head section, a spinal section, a pelvic section, a femoral section and a leg section, means for articulating each table section with respect to its adjacent section, a perineal cutout in said pelvic section at the edge thereof adjacent said femoral section, means for removing said leg section from said femoral section and means for dropping said femoral section downward to an out of the way position to enable a surgeon to gain access to the patient through the perineal cutout.

22. A surgical table or the like comprising, in combination at least five table sections, said table sections including a head section, a spinal section, a pelvic section, a femoral section and a leg section, said sections being articulated with respect to each other and being of such length as to accommodate a man of average height so that the articulation between the head section and the spinal section is located substantially at the neck, the articulation between the spinal section and the pelvic section is located substantially at the lumbar arch, the articulation between the pelvic section and the femoral section is located adjacent the hip joint, the articulation between the femoral section and the leg section is located substantially at the knee joints, a perineal cutout in said pelvic section, means for adjusting the length of said spinal section and said femoral section to accommodate the table to persons of heights varying from the average, said perineal cutout being located at the transverse edge of said pelvic section adjacent said femoral section, and means for moving said leg section and said femoral section to an out of the way position to enable the surgeon to gain access to the patient through the perineal cutout and means for articulating said sections.

23. A surgical table or the like comprising, in combination, at least five table sections, said table section being connected in series and including a head section, a spinal section, a pelvic section, a femoral section and a leg section, said sections being articulated with respect to each other and being of such length as to accommodate a man of average height so that the articulation between the head section and the spinal section is located substantially at the neck, the articulation between the spinal section and the pelvic section is located substantially at the lumbar arch, the articulation between the pelvic section and the femoral section is located adjacent the hip joint and the articulation between the femoral section and the leg section is located substantially at the knee joints, means for articulating said table sections with respect to each other, a perineal cutout in said pelvic section, means for moving said femoral section and said leg section from a position obstructing access of the surgeon to said perineal cutout to a position permitting free access thereto, means for increasing or decreasing the overall length of the table to maintain the relative position of said articulations of the table relative to the anatomical articulations of a patient varying in height from the normal whereby upon adjustment of the table to accommodate the height of the patient, surgical operations may be performed on the patient through the perineal cutout and on other portions of the body of the patient without shifting the patient on the table.

24. A surgical table or the like in accordance with claim 23 in which the means for increasing or decreasing the overall length of the table comprises a two part femoral section in which the parts are telescopically movable with respect to each other.

25. A surgical table or the like in accordance with claim 23 in which the means for increasing or decreasing the overall length of the table comprises a two part spinal section and a two part femoral section, the parts of the spinal section and the femoral section being movable telescopically with respect to each other.

26. A surgical table or the like in accordance with claim 23 in which the means for moving said femoral section and said leg section from an obstructing position comprises means for removing said leg section from said femoral section and means for moving said femoral section downward and toward the head end of the table.

27. A surgical table or the like comprising, in combination, a plurality of table sections connected in series and articulated with respect to each other, means for articulating said sections, said table being of a length and width normally adapted for receiving adults, one of said sections being in two parts, one part being substantially wider than the other, means for removing the wider of said two parts from the narrower part leaving the narrower part attached to the table section adjacent it, said narrow part being of a width adapted to receive an infant enabling the surgeon to operate while in close proximity to the infant.

28. A surgical table or the like comprising, in combination, a plurality of table sections connected in series, one of said sections being a femoral section accommodating at least the upper legs, a lower leg section, means for swinging the leg section with respect to the femoral section, the line of swing of said leg section occurring directly below the knee joints, and means for varying the length of the femoral section in accordance with the physical proportions of the patient so that the line of swing occurs substantially directly below the knee joints throughout a wide range of heights of persons.

29. A surgical table or the like comprising, in combination, a plurality of table sections connected in series, one of said table sections being a femoral section and an adjacent section being a leg section, means for articulating said leg section with respect to said femoral section, locking means for locking said leg section in a desired position of adjustment with respect to said femoral section and a release lever for said locking means and means for automatically applying said locking means for locking said sections together upon release of said release lever from manual control.

References Cited in the file of this patent
UNITED STATES PATENTS

| | | |
|---|---|---|
| 2,472,675 | Mueller | June 7, 1949 |
| 2,520,455 | Clachko | Aug. 29, 1950 |
| 2,571,829 | Buckley | Oct. 16, 1951 |
| 2,794,694 | Fullwood et al. | June 4, 1957 |
| 2,872,259 | Thorpe | Feb. 3, 1959 |

FOREIGN PATENTS

| | | |
|---|---|---|
| 681,858 | Germany | Sept. 14, 1939 |
| 1,114,527 | France | Apr. 13, 1956 |